United States Patent
Agars et al.

(10) Patent No.: US 6,232,362 B1
(45) Date of Patent: May 15, 2001

(54) SELF-SENSITIZED EPOXYSILICONES CURABLE BY ULTRAVIOLET LIGHT AND METHOD OF SYNTHESIS THEREFOR

(75) Inventors: Robert F. Agars, Clifton Park; Richard P. Eckberg, Saratoga Springs, both of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/304,882

(22) Filed: May 4, 1999

(51) Int. Cl.$^7$ .................... C08G 77/04; C08G 77/14; C08F 2/50

(52) U.S. Cl. .............. 522/99; 522/148; 522/904; 528/33

(58) Field of Search .................. 528/26, 25, 32, 528/33; 522/99, 148, 172, 904

(56) References Cited

U.S. PATENT DOCUMENTS

| | | |
|---|---|---|
| 3,985,566 | * 10/1976 | Buhr et al. . |
| 4,279,717 | 7/1981 | Eckberg et al. . |
| 4,921,589 | * 5/1990 | Yates et al. . |
| 5,340,898 | 8/1994 | Cavezzan et al. . |
| 5,583,195 | 12/1996 | Eckberg . |

* cited by examiner

Primary Examiner—Susan W. Berman

(57) ABSTRACT

Photosensitized silicones having the formula $MD_nD^E{}_mD^*{}_pM$ are provided, wherein M is selected from the group consisting of $R_3SiO_{1/2}$ and $R_2ESiO_{1/2}$; wherein each R is independently selected from the group consisting of monovalent hydrocarbon radicals having from 1 to 30 carbons, and E is an epoxide functionalized substituent selected from the group of epoxy ether substitutents having the formula $C_6H_{11}O_2$ or the group of alkyl cyclohexeneoxide substituents having the formula $C_8H_{13}O$; D has the formula $R_2SiO_{2/2}$, wherein each R is independently selected from the group consisting of monovalent hydrocarbon radicals having from 1 to 30 carbons; $D^E$ has the formula $RESiO_{2/2}$ wherein R is selected from the group consisting of monovalent hydrocarbon radicals having from 1 to 30 carbon atoms, and wherein E is an epoxide functionalized substituent selected from the group of epoxy ether substituents having the formula $C_6H_{11}O_2$ or the group of alkyl cyclohexeneoxide substituents having the formula $C_8H_{13}O$; $D^*$ is defined as the reaction product of $D^E$ with a compound selected from the group consisting of R'COOH, (R'CO)$_2$O, R'COX, R'SO$_3$H, and R'SO$_2$X wherein R' is a photosensitizing naphthalene substituent and X is a halogen; and wherein the subscripts n, m, and p are integers where the sum of n+m+p ranges from about 10 to about 2,000. A method for preparing the photosensitized silicones is also provided.

16 Claims, No Drawings

SELF-SENSITIZED EPOXYSILICONES CURABLE BY ULTRAVIOLET LIGHT AND METHOD OF SYNTHESIS THEREFOR

BACKGROUND OF THE INVENTION

The present invention relates to ultraviolet curable silicone coating compositions. More particularly, it relates to modified epoxy functional polydiorganosiloxane silicone fluids which are effectively cured by ultraviolet radiation in the presence of iodonium salt.

Silicone release coatings are used to render surfaces non-adherent to materials which would normally adhere thereto, and are widely used as coatings which release pressure-sensitive adhesives for labels, decorative laminates, transfer tapes, and the like. Such release coatings are advantageously formed by the cross-linking of epoxy functional polydiorganosiloxane silicone fluids in the presence of an ultraviolet (UV) cationic initiator. Suitable bis(aryl)iodonium salt cationic photocatalysts, for example bis(4-alkylphenyl)iodonium hexafluoroantimonate, have been disclosed in U.S. Pat. No. 4,279,717 to Eckberg et al., which is incorporated by reference herein. Another class of UV-sensitive catalyst is disclosed in U.S. Pat. No. 5,340,898 to Cavezzan et al., comprising tetrakis(perfluorophenyl) borate anions.

Despite extensive investigation into silicone release coating compositions and catalysts therefor, there remains a need for systems which provide faster, more efficient photocatalyzed curing of reactive epoxy functional silicones. U.S. Pat. No. 5,583,195 to Eckberg has reported synthesis and use of epoxy functional silicone polymers which have been partially or completely functionalized by a fluorescing, or a photosensitizing, or a simultaneously fluorescing and photosensitizing substituent bonded to the silicone polymer. These epoxy functionalized silicone derivatives are particularly useful for providing fluorescent dye marking compounds for determining the quality of the release coatings made therewith. In particular, Eckberg discloses reaction of an agent such as anthracene-9-carboxylate with an epoxy silicone to yield a functionalized epoxy silicone that possesses ultraviolet fluorescence activity and photosensitization activity. Such compounds are sensitizers for iodonium photocatalysts, promoting enhanced iodonium miscibility and enhanced photo cure response. Anthracenes however are expensive and therefore impractical for commercial use. Accordingly, there remains a continuing need in the art for commercially viable methods for the derivatization of epoxysilicones which will yield compounds of higher reactivity and excellent adhesion release coating properties.

SUMMARY OF THE INVENTION

Faster, more efficient photochemical curing of silicone release coatings is achieved by use of self-sensitized, modified epoxysilicones comprising napthalene derivatives incorporated into the silicone polymers. Such photosensitized silicones have the formula:

$$MD_n D^E_{m-p} D^*_p M$$

where

M is selected from the group consisting of $R_3SiO_{1/2}$ and $R_2ESiO_{1/2}$; wherein each R is independently selected from the group consisting of monovalent hydrocarbon radicals having from 1 to 30 carbons, and E is an epoxide functionalized substituent selected from the group of epoxy ether substitutents having the formula $C_6H_{11}O_2$ or the group of alkyl cyclohexeneoxide substituents having the formula $C_8H_{13}O$;

D has the formula $R_2SiO_{2/2}$, wherein each R is independently selected from the group consisting of monovalent hydrocarbon radicals having from 1 to 30 carbons;

$D^E$ has the formula $RESiO_{2/2}$ wherein R is selected from the group consisting of monovalent hydrocarbon radicals having from 1 to 30 carbon atoms, and wherein E is an epoxide functionalized substituent selected from the group of epoxy ether substituents having the formula $C_6H_{11}O_2$ or the group of alkyl cylcohexeneoxide substituents having the formula $C_8H_{13}O$;

$D^*$ is defined as the reaction product of $D^E$ with a compound selected from the group consisting of R'COOH, $(R'CO)_2O$, R'COX, $R'SO_3H$, and $R'SO_2X$ wherein R' is a photosensitizing naphthalene substituent and X is a halogen; and wherein the subscripts n, m, and p are integers where the sum of n+m+p is in the range from about 10 to about 2,000.

In addition to the compositions of the present invention the present invention also provides a method of preparing silicones of the formula:

$$MD_n D^E_{m-p} D^*_p M$$

comprising reacting a silicone of the formula $MD_n D^E_m M$ with a compound selected from the group consisting of R'COOH, $(R'CO)_2O$, R'COX, $R'SO_3H$, and $R'SO_2X$ where R' is a photosensitizing naphthalene substituent and X is a halogen; and the subscripts m, n and p are integers where the sum of m+n is in the range from about 10 to about 2,000.

DETAILED DESCRIPTION OF THE INVENTION

Photosensitized UV (or EB) photocurable epoxysilicone release coatings may be prepared via the reaction of a photosensitizing molecule containing at least one acid functionality or functionality convertible to an acid functionality, e.g., an acid halide, with an epoxysilicone via an acid catalyzed oxirane ring opening reaction. Using 4-ethylcyclohexene oxide as an exemplary oxide, the general reaction is:

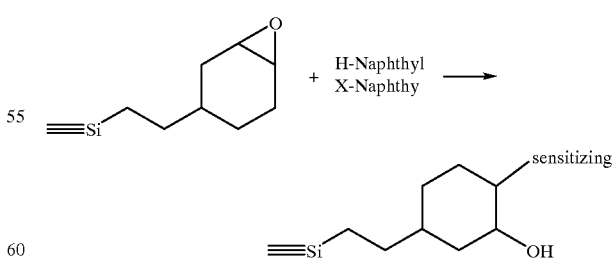

wherein "H-Naphthyl" indicates the acid form of a photosensitizing naphthyl species, and "X-Naphthyl" indicates the acid halide form of a photosensitizing naphthyl species, the halides including fluoride, chloride, bromide and iodide.

More specifically:

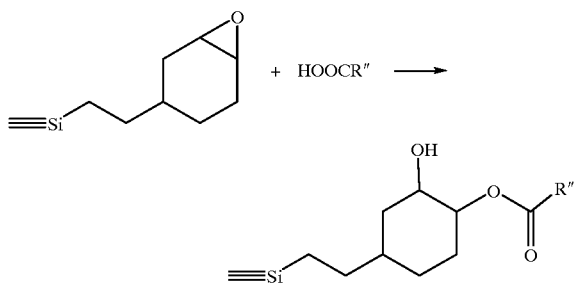

wherein R" is a photosensitizing naphthyl or naphthyl derivative. Suitable naphthyl derivatives include alkyl-substituted naphthalenes, wherein the carboxylate or other functionality comprises a substituted or unsubstituted hydrocarbon having from 1 to 10 carbons, i.e., 1-naphthylacetic acid, (1-naphthoxy)acetic acid, (2-naphthoxy)acetic acid, and the like. The naphthyl moiety may itself be substituted, e.g., with hydroxyl, halogen, or other substituents, e.g., 4-hydroxy-2-naphthylacetic acid and the like. Substituents within the scope of the present invention do not adversely affect derivatization or photosensitization.

The reaction with carboxylic acid halides (fluorides, chlorides, bromides, or iodides) or with sulfonic acid halides is similarly facile. Thus 100 parts of an epoxysilicone with an epoxy equivalent weight of 1,000, when reacted with one part of 1-naphthoic acid will yield silicone polymers having approximately 94% of the cycloaliphatic epoxy groups intact, i.e., unreacted, and also containing about 1.0 weight percent of a photosensitizing substituent as well. The reaction is generalizable to any photosensitizing naphthyl that can be chemically bonded via an acid substituent by the acid catalyzed oxirane ring opening reaction to an epoxysilicone.

The epoxy-functional photosensitizing polydimethylsiloxanes of the present invention have the formula:

$$MD_nD^E_{m-p}D^*_pM$$

wherein M is $R_3SiO_{1/2}$ or $R_2ESiO_{1/2}$; D is $R_2SiO_{2/2}$; and $D^E$ is $RESiO_{2/2}$. In the preceding formulae, R selected from the group consisting of monovalent saturated or unsaturated hydrocarbon radicals, generally having from one to about thirty carbon atoms for alkyl radicals, from two to about thirty carbon atoms for alkenyl and alkynyl radicals, from six to thirty carbon atoms for aryl radicals, and from six to thirty carbon atoms for alkylaryl radicals, from seven to thirty carbon atoms for monovalent alkylaryl hydrocarbon radicals, from one to thirty carbon atoms for monovalent halogen substituted alkyl hydrocarbon radicals, from two to thirty carbon atoms for halogen substituted alkenyl hydrocarbon radicals having, from two to thirty carbon atoms for monovalent halogen substituted alkynyl hydrocarbon, from six to thirty carbon atoms for monovalent halogen substituted aryl hydrocarbon radicals, and having from seven to thirty carbon atoms for monovalent halogen substituted alkylaryl hydrocarbon radicals. Preferably, R is phenyl, trifluoromethyl, or methyl.

Further in the preceding formulae, E is preferably an substituted or unsubstituted ether-containing hydrocarbon group, preferably epoxy ether substituents of the formula $C_6H_{11}O_2$, e.g.,

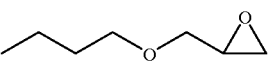

or an alkyl cyclohexeneoxide of the formula $C_8H_{13}O$, e.g.

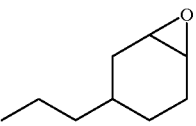

$D^*$ is the reaction product of $D^E$ with a compound selected from the group consisting of R'COOH, (R'CO)$_2$O, R'COX, R'SO$_3$H, and R'SO$_2$X wherein R' is a photosensitizing naphthyl substituent as defined above, and X is a halogen, wherein the halogen may be fluoride, chloride, bromide or iodide. Preferably R' is a substituent selected from the group consisting of naphthyl, naphthyloxy, hydroxynaphthyl, and hydroxynaphthyloxy.

The subscripts n, m, and p are integers where the sum of n+m+p is in the range from about 10 to about 2000, preferably from about 20 to about 400, and more preferably from about 50 to about 150. Preferably, the subscript p is less than the subscript m.

The reaction leading to the compounds of the present invention is convenient and bonds the photosensitizing moiety to the silicone framework via a carbon to oxygen bond. The present reaction scheme also allows for a controllable ratio of photosensitizing substitution to unreacted epoxy groups. This is accomplished by measuring the epoxy equivalent weight of the epoxy silicone before reacting with the acidic photosensitizing specie. By controlling the ratio of photosensitizing compound to epoxy groups during the reaction, the amount of photosensitizing substitution in the epoxysilicone may be controlled.

The process of photocatalyst sensitization is a process where a sensitizer molecule (or substituent) absorbs light at a different frequency by reference to the absorption frequency of the photocatalyst and transfers the energy of that absorbed light to the photocatalyst, either by direct energy transfer or indirectly, by proton or electron transfer or other chemical means, thereby effectively extending the range of useful incident light to wavelengths of light not usually absorbed. Therefore, the amount of photocatalyst may be reduced by reference to a nonsensitizing fluorescent moiety (substituent or compound) whereby smaller amounts of photocatalyst may be employed achieving the same rates of photocure at the same level of ultraviolet or electron beam flux in the curing process, or the rate of cure of the sensitized, photocatalyzed coating may be increased relative to that of the nonsensitized coating without increasing the amount of photocatalyst present. Thus the compounds of the present invention synthesized with photocatalyst sensitizing substituents may, if so desired, utilize smaller amounts of photocatalyst to achieve the same effective cure rate relative to fluorescent substituents where photocatalyst sensitization does not occur. "Cure time" is defined herein as the time interval between initial exposure to ultraviolet radiation and the time of maximum photocure exotherm as measured by differential photocalorimetry under the conditions and samples sizes as set forth in the experimental section and defines photocatalyst sensitization as being present when photocure times are below about 60 seconds, preferably below about 50 seconds, and more preferably below about 45 seconds.

Suitable photocatalysts that are preferred for use with the compounds described herein are selected from the group consisting of diazonium salts, diaryliodonium salts, triarylsulfonium salts, diaryliodosodium salts, triarylsulfoxonium salts, dialkylphenacylsulfonium salts, and ferrocenium salts. Typically, these cationic photoinitiating salts are salts of perhalohypervalent acids such as tetrafluoroborate, hexafluorophosphate, hexafluoroarsenate, hexafluoroantimonate, perchlorate, trifluoromethylsulfonate, and the like. The compounds of the present invention may also be cured by means of electron beams as long as a cationic photoinitiator is present. The amount of cationic photoinitiator required for ultraviolet or electron beam curing ranges from about 0.1 to about 10 weight percent based on the weight of the silane or siloxane present in the composition.

The invention is further illustrated by the following non-limiting examples.

EXAMPLE 1

150 g of an 288 centistoke (cstk) epoxy functionalized silicone fluid having an epoxy equivalent weight of 1250 and the general formula $MD_xD^E_yM$ was dispersed in 50 g toluene with 3 g (2 weight %) of 1-naphthoic acid and 3 g triethylamine. The solution was heated to 120° C., agitated under reflux at 120° C. for 8 hours, then cooled, and the solvent, excess amine, and low molecular weight siloxanes removed under vacuum to afford a fluid product of 410 cstk designated in the Tables below as Polymer 3. Presumably, approximately 14.5% of oxirane in the epoxysilicone is converted to the hydroxyester. Precisely analogous reactions were run with 1.5 and a 0.75 g of 1-naphthoic acid, respectively, yielding final products having a viscosity of 360 cstk (Polymer 2) and 315 cstk (Polymer 1).

The compatibility of the iodonium catalysts with these three modified epoxysilicones was studied by mixing 100 parts of each modified epoxysilicone with 2 parts catalyst solution. Catalyst solutions included about 50% bis (dodecylphenyl)iodonium hexafluoroantimonate (DDPI) with 2% ITX sensitizer in alkyl glycidyl ether (commercially available from GE Silicones under the trade name UV9380C); and approximately 50% solution of (4-octyloxyphenyl)phenyliodonium hexafluoroantimonate (OPPI) with 1.5 wt. % ITX in alkyl glycidyl ether; and then an approximately 40% solution of bis(dodecylphenyl) iodonium hexafluorophosphate (PF6) with 2 wt. % ITX in diacetone alcohol. The results of the compatibility study are shown in Table 1 below:

TABLE 1

| POLYMER | Naphthoic Acid (weight %) | DDPI | OPPI | PF6 |
| --- | --- | --- | --- | --- |
| 1 | 0.5 | Slightly hazy, stable | Opaque, Unstable | Opaque, Unstable |
| 2 | 1.0 | Clear mix, stable | Opaque mix, Unstable | Opaque, Unstable |
| 3 | 2.0 | Clear mix, stable | Clear mix, Stable | Clear mix, Stable |
| 4* | 0 | Hazy, stable** | Opaque, Unstable | Opaque, Unstable |

*Control
**'Stable' in this experiment indicates no catalyst 'crashing out' of suspension or solution in 24 hours.

EXAMPLE 2

The relative quantitative cure of the three polymers of Example 1 and photocatalyst blends as thin films manually applied to a Polykraft substrate using a Gardner Applicator were determined using a combination of maximum conveyer line speed and the minimum total UV lamp power required to convert the coatings to smear-and migration-free adhesive surfaces in an RPC Lab UV Processor. The results are shown in Table 2 below:

TABLE 2

| POLYMER | CATALYST | LINE SPEED (feet per minute) | UV LAMP POWER (watt/inch) |
| --- | --- | --- | --- |
| 3 | 4% PF6 | 400 | 400 |
| 3 | 2% UV9380C | 400 | 300 |
| 3 | 2% OPPI | 400 | 200 |
| 2 | 2% UV9380C | 400 | 300 |
| 1 | 2% UV9380C | 400 | 300 |
| 4* | 2% UV9380C | 400 | 400 |

*Control

The above results indicate that treatment of epoxy-functionalized silicones with 1-naphthoic acid yields self-sensitizing epoxysilicone polymers having enhanced miscibility with nonpolar additives such as iodonium photocatalysts. The good solubility of the PF6 salt catalyst with the 2% modified epoxysilicone (Polymer 3) was surprising, in view of the polarity associated with the smaller $PF_6^-$ anion compared to the larger $SbF_6^-$. For this same reason, photocure response of iodonium PF6 ally an order of magnitude slower then that of SbF6 analogs. The fast photocure response of the experimental PF6 catalyst is thus further evidence that naphthoic acid-modified epoxysilicone in fact enhances photocure speed as well as well as promoting iodonium catalyst miscibility.

EXAMPLE 3

In order to determine whether superior catalyst miscibility and photocure response were consistent in UV cure silicone release applications, several coating baths were prepared, coated, and photocured on an 18-inch pilot UV cure silicone release line. A 5 roll film splitting coater was used to lay down a thin, defect-free coating of 1.4 grams per square meter (gsm) weight on Otis UV350 grade 43#/ream super-calendered Kraft paper liner (SCK) or 1.0 gsm coatweight on Thilmany Polyethylene coated Kraft paper liner (PEK). Each bath was formulated as shown in Table 3 below and was cured on exposure to 2 banks, then 1 bank of 600 watt/inch Fusion™ Systems H lamps, thus generating two samples per bath. All coatings appeared well cured immediately offline. The samples were then laminated with TESA 7574 acrylic test tape, and the taped silicone coatings aged for 24 hours at 25° C. and 70° C. The force (in gram/inches)

required to pull the tape away from the silicone coated liner at a 180 degree angle at 300 inches per minute pull speed was then recorded. Heat aging of release laminates is considered a useful method of predicting future release stability. Comparison of the 70° C. aged release as a percent of the 25° C. aged release is therefore useful in differentiating performance of one coating compared to another. The results are shown in Table 3.

TABLE 3

| BATH | LAMPS | 25° C. RELEASE, (g/inch) | 70° C. RELEASE, (g/inch) | 70/25 RELEASE (%) |
|---|---|---|---|---|
| Polymer 4 + 2.5% UV9380C | 2 | 41 | 65 | 157% |
| Polymer 4 + 2.5% UV9380C | 1 | 40 | 121 | 303 |
| Polymer 3 + 2.5% UV9380C | 2 | 50 | 72 | 144 |
| Polymer 3 + 2.5% UV9380C | 1 | 49 | 115 | 235 |
| Polymer 3 + 2.0% OPPI | 2 | 48 | 69 | 144 |
| Polymer 3 + 2.0% OPPI | 1 | 51 | 78 | 153 |

The above results show that, particularly when coated at 600 feet per minute line speed and 1 bank of lamps, the 2 weight % naphthoic-acid modified epoxysilicone polymer 3 provides superior release stability compared to the control polymer, and even better performance when cured with the OPPI-containing catalyst solution.

EXAMPLE 4

In order to determine the long-term release stability of the naphthoic acid modified epoxysilicone polymers, a bath consisting of polymer 3 with 4% of the PF6 catalyst solution described in Example 2 was coated on the PEK liner at 600 feet per minute with 1 bank of H lamps providing cure. This cured coating was then laminated with Ashland 1085 solvent-borne acrylic PSA, and top laminated with an SCK face stock. The force required to peel away a 2-inch strip of the release liner lamina from the face stock lamina at 400 inched per minute and 180 degrees was recorded as the laminate construction was aged at 25° C. over 4 weeks. After one day aging, the force required was 32 g per 2 inches; after one week, the force required was 34 g per 2 inches; after two weeks, the force was 38 g per 2 inches; and after four weeks, the force required was 37 g per 2 inches. Such release stability is considered excellent and has not been previously reported for an iodonium PF6 photocatalyzed epoxysilicone release coating. Certain applications such as those requiring direct foot contact or medical uses require release constructions which do not contain heavy metals such as antimony. The above-described systems consisting of a modified epoxysilicone such as polymer 3 and a compatible iodonium PF6 salt would therefore would be very useful in such applications. Replacement of the SbF6 anion with a PF6 anion also provides for a less expensive iodonium photocatalyst.

EXAMPLE 5

125 g of epoxysilicone UV9315 having an epoxy equivalent weight of 1250 was dispersed in 45 g of high boiling alkanes (Isopar™L) with 5 g of methyl ethyl ketone (MEK). 2.5 g of (1-naphthoxy)acetic acid and 2 g of triethylamine were added and the resulting dispersion agitated for 6 hours at 135° C. Excess amine, solvent, and lower boiling silicones were removed under vacuum to yield a clear 473 cstk viscosity fluid (Polymer 5).

EXAMPLE 6

125 g of epoxysilicone UV9315 having an epoxy equivalent weight of 1250 reacted with 2.5 g of 1-naphthylacetic acid as described in Example 5 above, to yield a clear 488 cstk viscosity fluid (Polymer 6).

EXAMPLE 7

The polymers of Examples 5 and 6 were found to possess the same miscibility characteristics with the above-described iodonium catalysts. Qualitative cure studies on manually applied thin films of catalyzed baths of each polymer with three different catalysts were performed as described above with the results for minimum lamp power required to cure each coating bath to a smear-and migration-free adhesive surface (conveyor line speed of the RPC UV Processor was held constant at 400 feet per minute as shown in Table 4 below.

TABLE 4

| POLYMER | CATALYST | TOTAL LAMP POWER (Watt/Inch) |
|---|---|---|
| 5 | 2% UV9380C | 300 watt |
| 5 | 2% OPPI | 100 watt |
| 5 | 4% PF6 | 300 watt |
| 4* | 2% UV9380C | 400 watt |
| 6 | 2% OPPI | 300 watt |
| 6 | 2% 479-15-2647 | 100 watt |
| 6 | 4% PF6 | 300 watt |

*Control

The qualitative cure results are quite good, even superior to those obtained with the 2% naphthoic acid modified polymer.

EXAMPLE 8

Further evidence of polymer self-sensitization is provided by Differential Photocalorimetry. A Perkin Elmer DSC7 calorimeter equipped with a photocure accessory was used to assess the photocure response of representative coating baths. The lamp used for this study was a 200 watt mercury-xenon high pressure UV lamp rich in long wavelength UV, such that the results may not apply to the usual medium pressure mercury vapor deep UV sources commonly used in commercial UV curing. Isothermal 30° C. determinations were made. Results are shown in Table 5 below:

TABLE 5

| BATH | DELTA H (J/g) | % H of Theoretical | t(peak) = t(peak) − t(o) |
|---|---|---|---|
| 4 + 2% UV9380C | 34.1 | 45.7 | 1.617 minutes |
| 4 + 2% 47945-2595* | 25.3 | 33.9 | 3.033 |
| 5 + 2% 479-15-2595 | 48.1 | 73.5 | 1.033 |
| 5 + 2% OPPI | 42.9 | 65.5 | 0.833 |

*479-15-2595 = UV9380C without ITX sensitizer (a sensitizer-free catalyst formulation).

These data are further evidence that polymer 5 is a self-sensitizing epoxy silicone polymer. The percent of theoretical Delta H is based on 93500 cal/mole oxirane polymerization heat of reaction.

While preferred embodiments have been shown and described, various modifications and substitutions may be

What is claimed is:

1. A photocurable silicone of the formula:

$$MD^E_{m-p}D^*_pM,$$

wherein M is selected from the group consisting of $R_3SiO_{1/2}$ and $R_2ESiO_{1/2}$; where each R is independently selected from the group consisting of monovalent alkyl hydrocarbon radicals having from one to about thirty carbon atoms, monovalent alkenyl hydrocarbon radicals having from two to about thirty carbon atoms, monovalent alkynyl hydrocarbon radicals having from two to about thirty carbon atoms, monovalent aryl hydrocarbon radicals having from six to about thirty carbon atoms, monovalent alkylaryl hydrocarbon radicals having from seven to about thirty carbon atoms, monovalent halogen substituted alkyl hydrocarbon radicals having from one to about thirty carbon atoms, monovalent halogen substituted alkenyl hydrocarbon radicals having from two to about thirty carbon atoms, monovalent halogen substituted alkynyl hydrocarbon radicals having from two to about thirty carbon atoms, monovalent halogen substituted aryl hydrocarbon radicals having from six to about thirty carbon atoms, and monovalent halogen substituted alkylaryl hydrocarbon radicals having from seven to about thirty carbon atoms, and where E is an epoxide functionalized substituted or unsubstituted hydrocarbon group;

D has the formula $R_2SiO_{2/2}$, where each R is as previously defined and is independently selected;

$D^E$ has the formula $RESiO_{2/2}$, where R is as previously defined and where E is an epoxide functionalized substituted or unsubstituted hydrocarbon group;

$D^*$ is defined as the reaction product of $D^E$ with a compound selected from the group consisting of R'COOH, (R'CO)$_2$O, R'COX, R'SO$_3$H, and R'SO$_2$X, where R' is a photosensitizing naphthyl group selected from the Group consisting of naphthyl, naphthyloxy, hydroxynaphthyl, hydroxynaphthyloxy and substituted naphthyl, wherein the substituted naphthyl has at least one substituent selected from the group consisting of hydroxyl, halogen, and alkyl having from 1 to 10 carbon atoms; and X is a halogen; and the subscripts n, m, and p are integers where the sum of n+m+p is in the range from about 10 to about 2,000 whereby said silicone is photo-sensitizing.

2. The silicone of claim 1 wherein E is selected from epoxy ether substituents having the formula $C_6H_{11}O_2$ or alkyl cyclohexeneoxide substituents having the formula $C_8H_{13}O$.

3. The silicone of claim 1 wherein the subscript p is equal to the subscript m.

4. The silicone of claim 1 further comprising a photocatalyst.

5. The silicone composition of claim 4 wherein said photocatalyst is selected from the group consisting of diazonium salts, diaryliodonium salts, triarylsulfonium salts, diaryliodosonium salts, triarylsulfoxonium salts, dialkylphenacylsulfonium salts, and ferrocenium salts.

6. The silicone composition of claim 5 wherein the salts are selected from the group consisting of tetrafluoroborate, hexafluorophosphate, hexafluoroarsenate, hexafluoroantimonate, tetrakis(perfluorophenyl)borate, perchlorate, and trifluoromethylsulfonate.

7. The silicone of claim 5, wherein the salt is a hexafluorophosphate salt.

8. A photocurable silicone of the formula:

$$MD^E_{m-p}D^*_pM,$$

wherein M is selected from the group consisting of $R_3SiO_{1/2}$; and $R_2ESiO_{1/2}$ where each R is independently selected from the group consisting of monovalent alkyl hydrocarbon radicals having from one to about thirty carbon atoms, monovalent alkenyl hydrocarbon radicals having from two to about thirty carbon atoms, monovalent alkynyl hydrocarbon radicals having from two to about thirty carbon atoms, monovalent aryl hydrocarbon radicals having from six to about thirty carbon atoms, monovalent alkylaryl hydrocarbon radicals having from seven to about thirty carbon atoms, monovalent halogen substituted alkyl hydrocarbon radicals having from one to about thirty carbon atoms, monovalent halogen substituted alkenyl hydrocarbon radicals having from two to about thirty carbon atoms, monovalent halogen substituted alkynyl hydrocarbon radicals having from two to about thirty carbon atoms, monovalent halogen substituted aryl hydrocarbon radicals having from six to about thirty carbon atoms, and monovalent halogen substituted alkylaryl hydrocarbon radicals having from seven to about thirty carbon atoms, and where E is an epoxide functionalized substituted or unsubstituted hydrocarbon group;

D has the formula $R_2SiO_{2/2}$, where each R is as previously defined and is independently selected;

$D^E$ has the formula $RESiO_{2/2}$, where R is as previously defined and where E is an epoxide functionalized substituted or unsubstituted hydrocarbon group;

$D^*$ is defined as the reaction product of $D^E$ with a compound selected from the group consisting of 1-naphthoic acid; 2-naphthoic acid; (1-naphthoxy) acetic acid; (2-naphthoxy)acetic acid; 4-hydroxy-2-naphthylacetic acid; and acid halide, acid anhydride, sulfonic acid, sulfonic acid halide, sulfinic acid, and sulfinic acid halide derivatives of the foregoing; and the subscripts n, m, and p are integers where the sum of n+m+p is in the range from about 10 to about 2,000 whereby said silicone is photo-sensitizing.

9. A photocurable silicone of the formula:

$$MD^E_{m-p}D^*_pM$$

wherein M is selected from the group consisting of $R_3SiO_{1/2}$ and $R_2ESiO_{1/2}$; where each R is independently selected from the group consisting of monovalent hydrocarbon radicals having from one to about thirty carbon atoms, monovalent alkenyl hydrocarbon radicals having from two to about thirty carbon atoms, monovalent alkynyl hydrocarbon radicals having from two to about thirty carbon atoms, monovalent aryl hydrocarbon radicals having from six to about thirty carbon atoms, monovalent alkylaryl hydrocarbon radicals having from seven to about thirty carbon atoms, monovalent halogen substituted alkyl hydrocarbon radicals having from one to about thirty carbon atoms, monovalent halogen substituted alkenyl hydrocarbon radicals having from two to about thirty carbon atoms, monovalent halogen substituted alkynyl hydrocarbon radicals having from two to about thirty carbon atoms, monovalent halogen substituted aryl hydrocarbon radicals having from six to about thirty carbon atoms, and monovalent halogen substituted alkylaryl hydrocarbon radicals having from seven to about thirty carbon atoms, and where E is an epoxide functionalized substituted or unsubstituted hydrocarbon group;

D has the formula $R_2SiO_{2/2}$, where each R is as previously defined and is independently selected;

$D^E$ has the formula $RESiO_{2/2}$, where R is as previously defined and where E is an epoxide functionalized substituted or unsubstituted hydrocarbon group;

D* is defined as the reaction product of $D^E$ with a compound selected from the group consisting of R'COOH, (R'CO)$_2$O, R'COX, R'SO$_3$H, and R'SO$_2$X, where X is a halogen and R' is a photosensitizing naphthyl group selected from the group consisting of naphthyl, naphthyloxy, naphthylalkyl having from 1 to 10 alkyl carbons, and any of the foregoing substituted on the naphthyl ring with at least one hydroxyl or halogen;

and the subscripts n, m, and p are integers where the sum of n+m+p is in the range of about 10 to about 2,000.

10. The silicone of claim 9 having a cure speed as measured by differential photocalorimetry less than about 60 seconds.

11. The silicone of claim 9 having a cure speed as measured by differential photocalorimetry less than about 50 seconds.

12. The silicone of claim 9 having a cure speed as measured by differential photocalorimetry less than about 45 seconds.

13. A method of preparing silicones of the formula:

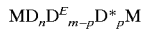

where M is selected from the group consisting of $R_3SiO_{1/2}$ and $R_2ESiO_{1/2}$; where each R is independently selected from the group consisting of monovalent alkyl hydrocarbon radicals having from one to about thirty carbon atoms, monovalent alkenyl hydrocarbon radicals having from two to about thirty carbon atoms, monovalent alkynyl hydrocarbon radicals having from two to about thirty carbon atoms, monovalent aryl hydrocarbon radicals having from six to about thirty carbon atoms, monovalent alkylaryl hydrocarbon radicals having from seven to about thirty carbon atoms, monovalent halogen substituted alkyl hydrocarbon radicals having from one to about thirty carbon atoms, monovalent halogen substituted alkynyl hydrocarbon radicals having from two to about thirty carbon atoms, monovalent halogen substituted alkynyl hydrocarbon radicals having from two to about thirty carbon atoms, monovalent halogen substituted aryl hydrocarbon radicals having from six to about thirty carbon atoms, and monovalent halogen substituted alkylaryl hydrocarbon radicals having from seven to about thirty carbon atoms; where E substituted or unsubstituted hydrocarbon group:

D has the formula $R_2SiO_{2/2}$, where R is as previously defined and each R is independently selected;

$D^E$ has the formula $RESiO_{2/2}$ with R and E as previously defined; and

D* is defined as the reaction product of $D^E$ with a compound selected from the group consisting of R'COOH, (R'CO)$_2$O, R'COX, R'SO$_3$H, and R'SO$_2$X; where R' is a photosensitizing naphthyl group selected from the group consisting of naphthyl, naphthyloxy, hydroxynaphthyl, hydroxynaphthyloxy and substituted naphthyl, wherein the substituted naphthyl has at least one substituent selected from the group consisting of hydroxyl, halogen, and alkyl having from 1 to 10 carbon atoms; and X is a halogen; and the subscripts n, m, and p are integers where the sum of n+m+p ranges from about 10 to about 2,000 whereby said silicone is fluorescent or fluorescent and photosensitizing; comprising reacting a silicone of the formula $MD_nD^E_mM$ with a compound selected from the group consisting of R'COOH, (R'CO)$_2$, R'COX, R'SO$_3$H, and R'SO$_2$X where R' is a photosensitizing naphthyl group selected from the group consisting of naphthyl, naphthyloxy, hydroxynaphthyl, hydroxynaphthyloxy and substituted naphthyl, wherein the substituted naphthyl has at least one substituent selected from the group consisting of hydroxyl, halogen, and alkyl having from 1 to 10 carbon atoms; and X is a halogen.

14. The method of claim 13 wherein E is selected from epoxy ether substituents having the formula $C_6H_{11}O_2$ or alkyl cyclohexeneoxide substituents having the formula $C_8H_{13}O$.

15. The method of claim 13 wherein the subscript p is equal to the subscript m.

16. A method of preparing silicones of the formula:

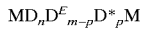

where M is selected from the group consisting of $R_3SiO_{1/2}$ and $R_2ESiO_{1/2}$; where each R is independently selected from the group consisting of monovalent alkyl hydrocarbon radicals having from one to about thirty carbon atoms, monovalent alkenyl hydrocarbon radicals having from two to about thirty carbon atoms, monovalent alkynyl hydrocarbon radicals having from two to about thirty carbon atoms, monovalent aryl hydrocarbon radicals having from six to about thirty carbon atoms, monovalent alkylaryl hydrocarbon radicals having from seven to about thirty carbon atoms, monovalent halogen substituted alkyl hydrocarbon radicals having from one to about thirty carbon atoms, monovalent halogen substituted alkynyl hydrocarbon radicals having from two to about thirty carbon atoms, monovalent halogen substituted alkynyl hydrocarbon radicals having from two to about thirty carbon atoms, monovalent halogen substituted aryl hydrocarbon radicals having from six to about thirty carbon atoms, and monovalent halogen substituted alkylaryl hydrocarbon radicals having from seven to about thirty carbon atoms; where E substituted or unsubstituted hydrocarbon group;

D has the formula $R_2SiO_{2/2}$, where R is as previously defined and each R is independently selected;

$D^E$ has the formula $RESiO_{2/2}$ with R and E as previously defined; and

D* is defined as the reaction product of $D^E$ with a compound selected from the group consisting of 1-naphthoic acid; 2-naphthoic acid; (1-naphthoxy) acetic acid; (2-naphthoxy)acetic acid; 4-hydroxy-2-naphthylacetic acid; and acid halide, acid anhydride, sulfonic acid, sulfonic acid halide, sulfinic acid, and sulfinic acid halide derivatives of the foregoing; and the subscripts n, m, and p are integers where the sum of n+m+p ranges from about 10 to about 2,000 whereby said silicone is fluorescent or fluorescent and photosensitizing; comprising reacting a silicone of the formula $MD_nD^E_mM$ with a compound selected from the group consisting of 1-naphthoic acid; 2-naphthoic acid; (1 -naphthoxy) acetic acid; (2-naphthoxy)acetic acid; 4-hydroxy-2-naphthylacetic acid; and acid halide, acid anhydride, sulfonic acid, sulfonic acid halide, sulfinic acid, and sulfinic acid halide derivatives of the foregoing.

* * * * *